May 5, 1925.
E. W. STOSSEL
SPRING CONNECTION
Filed Sept. 15, 1924
1,536,981
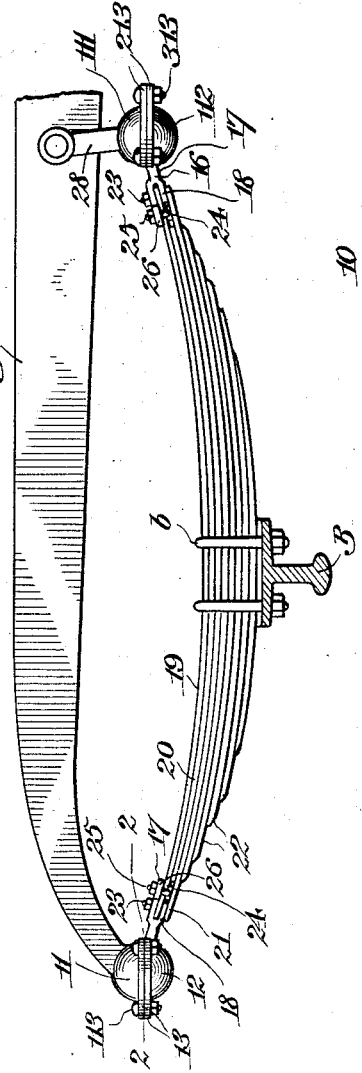
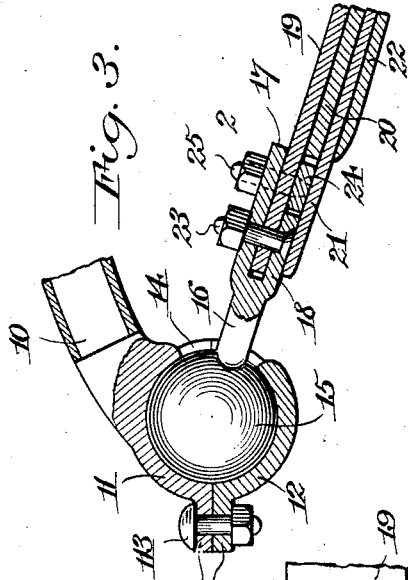
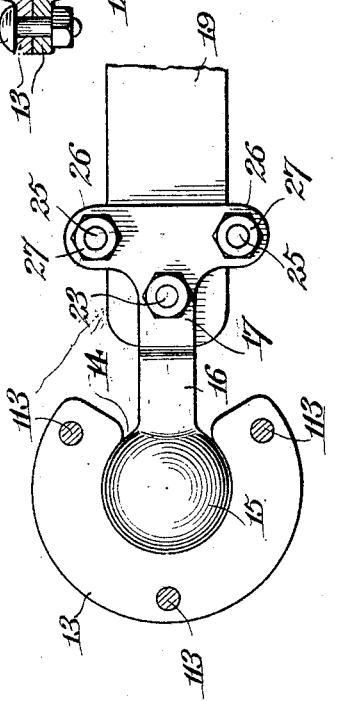
WITNESSES:
INVENTOR,
Elvir W. Stossel
BY
ATTORNEYS.

Patented May 5, 1925.

1,536,981

UNITED STATES PATENT OFFICE.

ELVIR W. STOSSEL, OF ASBURY PARK, NEW JERSEY.

SPRING CONNECTION.

Application filed September 15, 1924. Serial No. 737,872.

*To all whom it may concern:*

Be it known that I, ELVIR W. STOSSEL, a citizen of the United States of America, and a resident of Asbury Park, in the county of Monmouth and State of New Jersey, have invented a new and Improved Spring Connection, of which the following is a description.

My invention relates to a means to connect the ends of a spring to the side bar of a frame of an automobile or other vehicle.

The invention has in view twisting or distortion of the spring due to an axle rising or dropping at one end.

The general object of my invention is to provide a universal connection for each end of the spring of a character that will enable the spring to instantly conform to the angular position of the axle due to rising or falling of one wheel of the axle, relatively to the opposite end of the axle.

A more specific object of the invention is to provide a universal spring connection that will eliminate or minimize the strains on the connecting means as well as to provide a connecting means involving few parts of simple form and of the necessary strength.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a side elevation of a spring secured to a frame bar by my improved spring connection;

Figure 2 is an enlarged detail in section in a plane indicated by the line 2—2, Figure 1;

Figure 3 is a longitudinal vertical section of the spring connection at one end of the spring.

In the illustrated example the letter A indicates a fragment of the side bar of a chassis frame, the letter B an axle in cross section; and *b* the axle clips.

In carrying out my invention in accordance with the illustrated example, one end of the spring is supported on an element 10 usually called a gooseneck forming the terminal of the frame bar A. Said element 10 has a socket section 11 which is thus rigid with the bar A. The socket is completed by a section 12, the sections 11, 12 having ears 13 secured by bolts 113 to hold said sections in rigid relation. At that side of the socket 11 toward the spring a slot 14 is formed jointly in the sections 11 and 12.

The ball 15 for completing the ball and socket connection with the spring and the terminal element 10 of bar A is formed with a shank 16 which passes from the ball outwardly through the slot 14 and provided with means to effect such a connection with the spring as to permit the ball 15 to accommodate itself to all movements of the spring as will appear.

On that end of the shank 16 opposite the ball 15 is a fork 17 the under member 18 of which is shorter than the top member of the fork and both members are secured to the upper or longest leaf 19 of the spring. The next leaf 20 below the topmost leaf 19 is shorter and the third leaf 21 is again lengthened beyond the intermediate leaf 20 and approximates in length the leaf 19. The numeral 22 indicates the successively shorter leaves at the under side of the spring, which leaves 22 may be provided in any suitable number. To securely connect the fork 17 with the leaf 19 a bolt 23 is passed through both members of said fork and through the leaf 19 adjacent the end thereof, said leaf being entered between the members of fork 17. A further connection is effected between the longer members of the fork 17 and the leaf 19 by means of a clip or shackle 24, the shanks 25 of which pass through side lugs 26 integral with the longer member of fork 17 and receive nuts 27, the said shanks 25 of shackle 24 lying at the sides of spring leaf 19. It will be observed that the leaf 20 directly beneath the topmost leaf 19 terminates adjacent to the clip 24 and it will be seen that the next lowermost leaf 21 extends beneath and covers said clip 24 and beneath and covers the bolt 23, the head of which bolt 23 is countersunk in the lower shorter member 18 of fork 17.

The opposite end of the spring is connected with the frame bar A or other fixed support according to the position of the spring on the vehicle by a ball and socket connection essentially the same as described with respect to the connection of the spring with the element 10. In the illustrated example a known hanger or shackle 28 is provided on the bar A distant from the element 10 and has integral therewith a socket section 111 therein, corresponding with the section 11, there being a mating socket section 112 corresponding with the socket section 12, and said sections 111, 112 having flanges 213 secured by bolts 313. The ball 15 is employed in the socket formed by the sections 111, 112, the same as in the socket formed by the sections 11 and 12 and has the described shank 16 and the fork 17 as well as the fastening means for said fork all as described in connection with the devices pertaining to the ball 15 in the socket sections 11 and 12.

With the described arrangement, it will be seen that the axis of the shank 16 and ball 15 is in line with the main leaf 19 of the spring and that the ball and socket connection at both ends are in the same line. The result is that the balls in the sockets are free to conform to any bending, twisting, or other distortion of the spring. If one wheel of the axle rises or sinks relatively to the other wheel, the spring may, for example, be given movement which would tend to swing the forked shank 16 and the balls thereon bodily through an arc but this tendency will not develop with the arrangement described because any twisting movement of the spring or a movement about an axis coincident with the axes of the balls 15 will result in a turning movement about the said axes. The consequence is that there can be no binding of the balls in their sockets such as would occur were the spring balls not in line with each other and the balls in line with the shank 16 and with the respective ends of the main spring leaf. Moreover, the forming of the ball with the forked shank 16 integral therewith and the described manner of fastening said fork to the spring, result in the maximum strength.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A spring, and means to secure the same, said means comprising sockets, balls in said sockets and capable of universal movement therein, shanks rigid with the balls disposed at the sides toward the ends of the spring, forks on the outer ends of the shanks, said forks presenting one arm longer than the other, shackles securing the ends of the main leaf of the spring to the longer arm of the fork, said ends of said leaf extending between the members of the fork and each end disposed in line with the axis of the adjacent shank and ball, and bolts fastening both the longer and shorter arms of the forks and the respective ends of said spring together.

2. A spring and means to secure the same, said means comprising sockets, balls in said sockets and capable of universal movement therein, shanks rigid with said balls and disposed toward the ends of the spring, forks rigid with the outer ends of the shanks, said forks receiving the ends of a leaf of the spring, and means fastening said forks to said spring leaf.

ELVIR W. STOSSEL.